United States Patent
Yang et al.

(10) Patent No.: US 11,818,036 B2
(45) Date of Patent: Nov. 14, 2023

(54) DATA PROCESSING METHOD, APPARATUS, AND DEVICE

(71) Applicant: HUAWEI TECHNOLOGIES CO., LTD., Shenzhen (CN)

(72) Inventors: Rongyu Yang, Hangzhou (CN); Yumin Wu, Hangzhou (CN); Tianchi Hu, Hangzhou (CN); Tao Li, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/990,942

(22) Filed: Nov. 21, 2022

(65) Prior Publication Data
US 2023/0082069 A1 Mar. 16, 2023

Related U.S. Application Data

(63) Continuation of application No. PCT/CN2021/088544, filed on Apr. 20, 2021.

(30) Foreign Application Priority Data

May 29, 2020 (CN) .......................... 202010476791.0

(51) Int. Cl.
*H04L 45/24* (2022.01)
*H04L 49/253* (2022.01)

(52) U.S. Cl.
CPC .......... *H04L 45/245* (2013.01); *H04L 49/253* (2013.01)

(58) Field of Classification Search
CPC .......................... H04L 45/245; H04L 49/253
USPC .......................................................... 370/392
See application file for complete search history.

(56) References Cited

U.S. PATENT DOCUMENTS

| | | | |
|---|---|---|---|
| 2007/0081557 A1* | 4/2007 | Binetti | H04L 69/14 370/477 |
| 2014/0003285 A1* | 1/2014 | Jain | H10N 70/011 370/254 |
| 2014/0122755 A1* | 5/2014 | Chandra | H04L 69/28 710/106 |

* cited by examiner

*Primary Examiner* — Faisal Choudhury
(74) *Attorney, Agent, or Firm* — HUAWEI TECHNOLOGIES CO., LTD.

(57) ABSTRACT

In a data processing method, a timeout aggregation node of a cluster obtains first data that is partial aggregated data in a data-intensive computing task. The first data carries a first identifier of a timeout node indicating that a timeout occurs on the timeout node. The timeout aggregation node obtains second data of the timeout node based on the first identifier, where the second data is to-be-aggregated data sent by the timeout node. The timeout aggregation node aggregates the first data and the second data according to a preset rule to obtain third data that is complete aggregated data. The timeout aggregation node then notifies each computing node in the cluster of the third data.

20 Claims, 4 Drawing Sheets

DATA PROCESSING METHOD, APPARATUS, AND DEVICE

CROSS-REFERENCE TO RELATED APPLICATIONS

This application is a continuation of International Application PCT/CN2021/088544, filed on Apr. 20, 2021, which claims priority to Chinese Patent Application No. 202010476791.0, filed on May 29, 2020. The disclosures of the aforementioned priority applications are hereby incorporated by reference in their entirety.

TECHNICAL FIELD

This application relates to the field of computing technologies, and in particular, to a data processing method, apparatus, and device.

BACKGROUND

To provide a more powerful computing capability, a cluster such as a high-performance computing cluster (HPCC) or an artificial intelligence (AI) cluster continuously expands in scale, and there are an increasingly large quantity of computing nodes. In many scenarios, data of all computing nodes in the cluster needs to be transmitted to a specified computing node, and the specified computing node performs an aggregation operation to obtain aggregated data, and then distributes the aggregated data to each computing node. In this way, data sent by each computing node may be forwarded by a plurality of levels of switches in a network before reaching the specified computing node that performs the aggregation operation. Consequently, a large amount of data is transmitted in the network, and a network congestion problem is very likely to occur due to insufficient network bandwidth and a relatively large network delay.

Currently, to alleviate the network congestion problem, a data aggregation function is assigned to all levels of switches in the cluster, and data of the computing nodes is aggregated level by level by the switch. In a process of performing aggregation level by level by the switch, the switch aggregates received data only after receiving data sent by all directly connected computing nodes, and sends an aggregation result to an upper-level switch. In this case, a network resource occupied for a thread or process used by the switch to perform an aggregation operation can be released. However, due to impact of a plurality of factors such as a network transmission delay and different processing capabilities of computing nodes, in an aggregation process, each level of switch cannot simultaneously receive to-be-aggregated data of all directly connected lower-level computing nodes. Consequently, the switch cannot complete the aggregation process, and cannot release a network resource occupied for aggregation. If the cluster includes a plurality of computing nodes for which there is a delay in sending to-be-aggregated data, all levels of switches connected to the computing nodes need to wait until all to-be-aggregated data is received, and then aggregation can be performed. In the process, network resources of a plurality of switches need to be occupied for a long time. Consequently, aggregation processing is time-consuming and inefficient. Therefore, how to provide an efficient data aggregation processing method becomes a technical problem that needs to be urgently resolved.

SUMMARY

Based on this, this application provides a data processing method, apparatus, and device, so that when there is a delay in sending to-be-aggregated data in a cluster, network resources of a plurality of switches do not need to be occupied for a long time to wait for to-be-aggregated data sent by a timeout node, to improve data aggregation processing efficiency in the cluster.

According to a first aspect, this application provides a data processing method. The method is applied to a timeout aggregation node in a cluster. The cluster is used for a computing data-intensive computing task. The method may specifically include: The timeout aggregation node obtains partial aggregated data in the computing data-intensive computing task, where the partial aggregated data is recorded as first data, and the first data carries a first identifier used to indicate that a timeout occurs on a timeout node; the timeout aggregation node obtains, based on the first identifier, to-be-aggregated data sent by the timeout node, where the to-be-aggregated data is recorded as second data; the timeout aggregation node aggregates the first data and the second data according to a preset rule to obtain complete aggregated data, where the complete aggregated data is recorded as third data; and the timeout aggregation node may notify each computing node in the cluster of the third data. It may be learned that in the method, the timeout aggregation node is determined in the cluster, and if there is a timeout node, the timeout aggregation node waits for to-be-aggregated data of the timeout node, and performs a final aggregation operation. A switch may perform partial aggregation only on partial received to-be-aggregated data, and then may send a partial aggregation result, and after sending the partial aggregation result, can release a network resource occupied by the switch to perform the current aggregation operation, and does not need to wait to receive and aggregate to-be-aggregated data of all directly connected lower-level switches or computing nodes, to improve data aggregation processing efficiency in the cluster.

In a possible implementation, the cluster includes but is not limited to an HPCC and an AI cluster, to improve data aggregation processing efficiency in the HPCC or the AI cluster.

In another possible implementation, a root switch receives fourth data sent by all directly connected sub-switches, and then aggregates all the fourth data to obtain the first data, where the fourth data includes the partial aggregated data sent by a sub-switch directly connected to the timeout node. In this way, when the cluster includes a timeout node, the root switch performs partial aggregation on received data, and then sends a partial aggregation result to the timeout aggregation node, and the root switch may release a network resource occupied to perform the current aggregation operation, and does not need to wait for to-be-aggregated data with a relatively large delay for a long time, to improve data aggregation processing efficiency in the cluster.

In another possible implementation, the aggregating the first data and the second data according to a preset rule to obtain third data may specifically include: The timeout aggregation node first determines data types of the first data and the second data, and then determines whether an aggregation result of the data types is related to an aggregation sequence; and when the aggregation result of the data types is unrelated to the aggregation sequence, aggregates the first data and the second data based on an obtaining sequence, to obtain the third data; or when the aggregation result of the data types is related to the aggregation sequence, aggregates the first data and the second data based on a preset aggregation sequence, to obtain the third data. In this way, a data type of to-be-aggregated data finely corresponds to a different preset rule, and corresponding aggregation is performed according to the preset rule, so that an aggregation result is more accurate.

In another possible implementation, the second data sent by the timeout node may further include a timeout flag bit, and the timeout flag bit is used to indicate that the second data is to-be-aggregated data of the timeout node, and is further used to indicate that the second data participates in aggregation at the timeout aggregation node, and does not participate in aggregation at all nodes through which the second data passes for transmission, and is merely bypassed and forwarded. The second data needs to be carried in a packet. In the packet, the timeout flag bit may be carried in a reserved field in a packet header, and a value of the reserved field is used to indicate the timeout node that generates the second data. In this way, each sub-switch that forwards the to-be-aggregated data of the timeout node and the root switch can determine, based on the timeout flag bit in the to-be-aggregated data, that the to-be-aggregated data is sent by the timeout node, and therefore do not process the to-be-aggregated data, and directly bypass and forward the to-be-aggregated data to the timeout aggregation node, to provide a reliable data basis for completing final aggregation.

In another possible implementation, the timeout node may be determined based on a locally preset time threshold by the sub-switch directly connected to the timeout node; and/or the timeout node may be determined by a management node based on an aggregation status of each computing node in a historical aggregation operation. In an example, when the timeout node is determined based on the locally preset time threshold by the sub-switch directly connected to the timeout node, the timeout flag bit is generated based on a local bypass entry by the sub-switch directly connected to the timeout node and added to the second data. The bypass entry is generated in local storage space after the sub-switch directly connected to the timeout node determines that a timeout occurs on the timeout node, and the bypass entry is used to indicate a correspondence between the timeout node and an aggregation command. In this way, a timeout status of a lower-level node directly connected to the sub-switch or the root switch directly connected to the timeout node is recorded by using the bypass entry on the sub-switch or the root switch directly connected to the timeout node, to provide effective guidance for forwarding the to-be-aggregated data of the timeout node, so that an aggregation process is orderly and efficiently performed. In another example, when the timeout node is determined by the management node based on the aggregation status of each computing node in the historical aggregation operation, the timeout flag bit is added to the second data by the timeout node. In this way, the timeout node or the sub-switch (or the root switch) directly connected to the timeout node adds the timeout flag bit to the to-be-aggregated data of the timeout node, to provide a basis for orderly forwarding the to-be-aggregated data and reliably completing a final aggregation operation.

In another possible implementation, a policy for selecting the timeout aggregation node in the cluster includes but is not limited to a selection policy 1 in which a fixed node in the cluster is selected as the timeout aggregation node; a selection policy 2 in which a node is determined as the timeout aggregation node based on a network load status, for example, a node with lightest load is selected as the timeout aggregation node; a selection policy 3 in which a node is randomly selected as the timeout aggregation node based on an identifier of each node in the cluster; and a selection policy 4 in which a node is determined as the timeout aggregation node based on a quantity of hops between each node and the root switch or link overheads, for example, a node corresponding to a smallest quantity of hops from the root switch or lowest link overheads is selected as the timeout aggregation node. In specific implementation, the timeout aggregation node may be a computing node, the management node, a sub-switch, the root switch, or a dedicated node. The dedicated node may be a node that is directly connected to the root switch and that is specifically configured to perform a final aggregation operation when a timeout occurs in the cluster. In this way, a node in the cluster is determined as the timeout aggregation node, the timeout aggregation node waits for the to-be-aggregated data sent by the timeout node, and another switch may release a network resource without completing complete or partial aggregation for a lower-level node directly connected to the another switch, thereby greatly improving data aggregation processing efficiency.

In another possible implementation, when the timeout aggregation node is a non-root switch, for example, when a computing node, the management node, a sub-switch, or a dedicated node is used as the timeout aggregation node, that the timeout aggregation node obtains first data is specifically as follows: The timeout aggregation node receives first data sent by the root switch in the cluster, where the first data is partial aggregated data obtained by the root switch by aggregating data send by lower-level sub-switches directly connected to the root switch. When the timeout aggregation node is the root switch, that the timeout aggregation node obtains first data is specifically as follows: The root switch aggregates a plurality of pieces of data that are sent by a directly connected sub-switch and that carry no timeout flag bit, to obtain the first data. In this way, based on another role of the timeout aggregation node in the cluster, a manner in which the timeout aggregation node obtains the partial aggregation result in the computing data-intensive computing task is distinguished, so that a data aggregation processing process is more reliable.

In another possible implementation, when the timeout aggregation node is directly connected to the timeout node, and the timeout aggregation node is an upper-level sub-switch of the timeout node or the root switch, if the cluster further includes a first node, a second node, and a third node, and the first node, the second node, and the third node are sub-switches or computing nodes directly connected to the timeout aggregation node, an operation performed by the timeout aggregation node as a sub-switch or the root switch may include: at a first moment, receiving fifth data sent by the first node, and receiving sixth data sent by the second node; and when the timeout aggregation node does not receive, at a second moment separated from the first moment by a first threshold, data sent by the third node, determining that the third node is a timeout node, and aggregating the fifth data and the sixth data to obtain seventh data, where the seventh data carries a second identifier of the third node, and the second identifier is used to indicate that the third node is a timeout node. In addition, the timeout aggregation node further generates a bypass entry in reserved storage space. The bypass entry includes an identifier of the third node and an identifier of an aggregation command, and the bypass entry is used to indicate that a timeout occurs when the third node executes the aggregation command. In this implementation, that the timeout aggregation node obtains second data as the timeout aggregation node may specifically include: receiving, after the second moment, eighth data sent by the third node; determining that the eighth data matches the bypass entry; and optionally, adding the timeout flag bit to the eighth data to obtain the second data. After the timeout flag bit is added to the eighth data to obtain the second data, the method further includes: deleting the bypass entry. In addition, when the timeout aggregation node is a sub-switch, the method further includes: The timeout aggregation node sends the seventh data to an upper-level sub-switch or the root switch directly connected to the timeout aggregation node. In this way, when the timeout node is a lower-level node directly connected to the timeout aggregation node, the timeout aggregation node that serves as a sub-switch or the root switch performs partial aggregation, and then sends a partial aggregation result, and records, by using the bypass entry, a timeout status of the timeout node directly connected to the timeout aggregation node, to provide effective guidance for forwarding the to-be-aggregated data of the timeout node, so that an aggregation process is orderly and efficiently performed. In addition, after receiving the to-be-aggregated data of the timeout node, the timeout aggregation node deletes the bypass entry corresponding to the timeout node. In this way, space, of the timeout aggregation node, occupied by the bypass entry is freed, and a case in which the bypass entry misleads a subsequent aggregation operation is avoided, to improve reliability of the aggregation operation.

In another possible implementation, when the timeout aggregation node is directly connected to the timeout node, and the timeout aggregation node is an upper-level sub-switch of the timeout node or the root switch, if the cluster further includes a first node, a second node, and a third node, the first node, the second node, and the third node are sub-switches or computing nodes directly connected to the timeout aggregation node, and the management node determines that the third node is a timeout node, the timeout aggregation node sets (or the management node sets at the timeout aggregation node) that the third node does not participate in a partial aggregation operation performed at the timeout aggregation node. In this case, an operation performed by the timeout aggregation node as a sub-switch or the root switch may include: receiving fifth data sent by the first node, and receiving sixth data sent by the second node; and aggregating the fifth data and the sixth data to obtain seventh data, where the seventh data carries a second identifier of the third node, and the second identifier is used to indicate that the third node is a timeout node. In addition, when the timeout aggregation node is a sub-switch, the timeout aggregation node further sends the seventh data to an upper-level sub-switch or the root switch directly connected to the timeout aggregation node. In this way, when serving as the root switch or a sub-switch, the timeout aggregation node does not need to consider to-be-aggregated data of the third node, and may quickly complete partial aggregation, to implement efficient data aggregation processing. In addition, the to-be-aggregated data sent by the third node to the timeout aggregation node may carry the timeout flag bit.

According to a second aspect, this application provides a data processing apparatus. The data processing apparatus is applied to a timeout aggregation node in a cluster. The cluster is used for a computing data-intensive computing task. The apparatus includes an obtaining unit, a first aggregation unit, and a notification unit. The obtaining unit is configured to obtain first data. The first data is partial aggregated data in the computing data-intensive computing task, the first data carries a first identifier of a timeout node, and the first identifier is used to indicate that a timeout occurs on the timeout node. The obtaining unit is further configured to obtain second data of the timeout node based on the first identifier of the timeout node. The second data is to-be-aggregated data sent by the timeout node. The first aggregation unit is configured to aggregate the first data and the second data according to a preset rule to obtain third data. The third data is complete aggregated data. The notification unit is configured to notify each computing node in the cluster of the third data.

Optionally, the first data is data obtained by aggregating all fourth data by a root switch in the cluster after receiving the fourth data sent by all directly connected sub-switches. The fourth data includes the partial aggregated data sent by a sub-switch directly connected to the timeout node.

Optionally, the first aggregation unit includes a first determining subunit, a first aggregation subunit, and a second aggregation subunit. The first determining subunit is configured to determine data types of the first data and the second data. The first aggregation subunit is configured to: when an aggregation result of the data types is unrelated to an aggregation sequence, aggregate the first data and the second data based on an obtaining sequence, to obtain the third data. The second aggregation subunit is configured to: when an aggregation result of the data types is related to an aggregation sequence, aggregate the first data and the second data based on a preset aggregation sequence, to obtain the third data.

Optionally, the timeout node is determined based on a locally preset time threshold by the sub-switch directly connected to the timeout node; or the timeout node is determined by a management node based on an aggregation status of each computing node in a historical aggregation operation.

Optionally, the second data includes a timeout flag bit, and the timeout flag bit is used to indicate that the second data is to-be-aggregated data of the timeout node, and participates in aggregation at the timeout aggregation node.

Optionally, when the timeout node is determined based on the locally preset time threshold by the sub-switch directly connected to the timeout node, the timeout flag bit is generated based on a local bypass entry by the sub-switch directly connected to the timeout node and added to the second data.

Optionally, the bypass entry is generated in local storage space after the sub-switch directly connected to the timeout node determines that a timeout occurs on the timeout node, and the bypass entry is used to indicate a correspondence between the timeout node and an aggregation command.

Optionally, when the timeout node is determined by the management node based on the aggregation status of each computing node in the historical aggregation operation, the timeout flag bit is added to the second data by the timeout node.

Optionally, a policy for selecting the timeout aggregation node in the cluster includes but is not limited to a selection policy 1 in which a fixed node in the cluster is selected as the timeout aggregation node; a selection policy 2 in which a node is determined as the timeout aggregation node based on a network load status, for example, a node with lightest load is selected as the timeout aggregation node; a selection policy 3 in which a node is randomly selected as the timeout aggregation node based on an identifier of each node in the cluster; and a selection policy 4 in which a node is determined as the timeout aggregation node based on a quantity of hops between each node and the root switch or link overheads, for example, a node corresponding to a smallest quantity of hops from the root switch or lowest link overheads is selected as the timeout aggregation node.

Optionally, the timeout aggregation node is a computing node or the management node.

Optionally, the timeout aggregation node is a sub-switch or the root switch.

Optionally, the timeout aggregation node is an upper-level sub-switch or the root switch directly connected to the timeout node.

Optionally, the data processing apparatus further includes a first receiving unit and a second aggregation unit. The first receiving unit is configured to: at a first moment, receive fifth data sent by a first node, and receive sixth data sent by a second node. The second aggregation unit is configured to: when data sent by a third node is not received at a second moment, aggregate the fifth data and the sixth data to obtain seventh data. The seventh data carries a second identifier of the third node, and the second identifier is used to indicate that the third node is a timeout node. Duration from the first moment to the second moment exceeds a first threshold. The first node, the second node, and the third node are sub-switches or computing nodes directly connected to the timeout aggregation node.

Optionally, when the data sent by the third node is not received at the second moment, the data processing apparatus further includes a generation unit, configured to generate a bypass entry in reserved storage space. The bypass entry includes an identifier of the third node and an identifier of an aggregation command, and the bypass entry is used to indicate that a timeout occurs when the third node executes the aggregation command.

Optionally, the obtaining unit may include: a receiving subunit and an adding subunit, where the receiving subunit is configured to receive, after the second moment, eighth data sent by the third node; and a second determining subunit, configured to determine that the eighth data matches the bypass entry, where the adding subunit is configured to add the timeout flag bit to the eighth data to obtain the second data.

Optionally, the data processing apparatus further includes a deletion unit, configured to delete the bypass entry after the timeout flag bit is added to the eighth data to obtain the second data.

Optionally, if a first node, a second node, and a third node are sub-switches or computing nodes directly connected to the timeout aggregation node, and the third node is a timeout node, the data processing apparatus further includes a setting unit, configured to set that the third node does not participate in a partial aggregation operation performed at the timeout aggregation node.

Optionally, the data processing apparatus further includes: a second receiving unit, configured to: receive fifth data sent by the first node, and receive sixth data sent by the second node; and a third aggregation unit, configured to aggregate the fifth data and the sixth data to obtain seventh data. The seventh data carries a second identifier of the third node, and the second identifier is used to indicate that the third node is a timeout node.

Optionally, when the timeout aggregation node is a sub-switch, the data processing apparatus further includes a sending unit, configured to send the seventh data to an upper-level sub-switch or the root switch directly connected to the timeout aggregation node.

Optionally, when the timeout aggregation node is a non-root switch, the obtaining unit is specifically configured to receive the first data sent by the root switch in the cluster; or when the timeout aggregation node is the root switch, the obtaining unit is specifically configured to aggregate a plurality of pieces of data that are sent by a directly connected sub-switch and that carry no timeout flag bit, to obtain the first data.

Optionally, the cluster is a high-performance computing cluster or an artificial intelligence cluster.

Optionally, the second data is carried in a packet, the timeout flag bit is defined in a reserved field in a packet header of the packet, and a value of the reserved field is used to indicate the timeout node that generates the second data.

According to a third aspect, this application provides a data processing device. The data processing device includes a processor and a memory. The memory is configured to store computer instructions. The processor is configured to perform the operation steps in the data processing method in any one of the first aspect or the possible implementations of the first aspect based on the computer instructions.

According to a fourth aspect, this application provides a cluster. The cluster includes at least a timeout node, a timeout aggregation node, and an upper-level sub-switch directly connected to the timeout node. The timeout aggregation node is configured to perform the operation performed by the timeout aggregation node in the data processing method in any one of the first aspect or the possible implementations of the first aspect. The timeout node is configured to perform the operation performed by the timeout node in the data processing method in any one of the first aspect or the possible implementations of the first aspect. The sub-switch is configured to perform the operation performed by the sub-switch in the data processing method in any one of the first aspect or the possible implementations of the first aspect.

According to a fifth aspect, this application provides a computer-readable storage medium. The computer-readable storage medium stores instructions, and when the instructions are run on a computer, the computer is enabled to perform the operation steps in the method in the foregoing aspects.

According to a sixth aspect, this application provides a computer program product including instructions. When the computer program product is run on a computer, the computer is enabled to perform the operation steps in the method in the foregoing aspects.

In this application, the implementations provided in the foregoing aspects may be further combined to provide more implementations.

DESCRIPTION OF EMBODIMENTS

Figure 1:
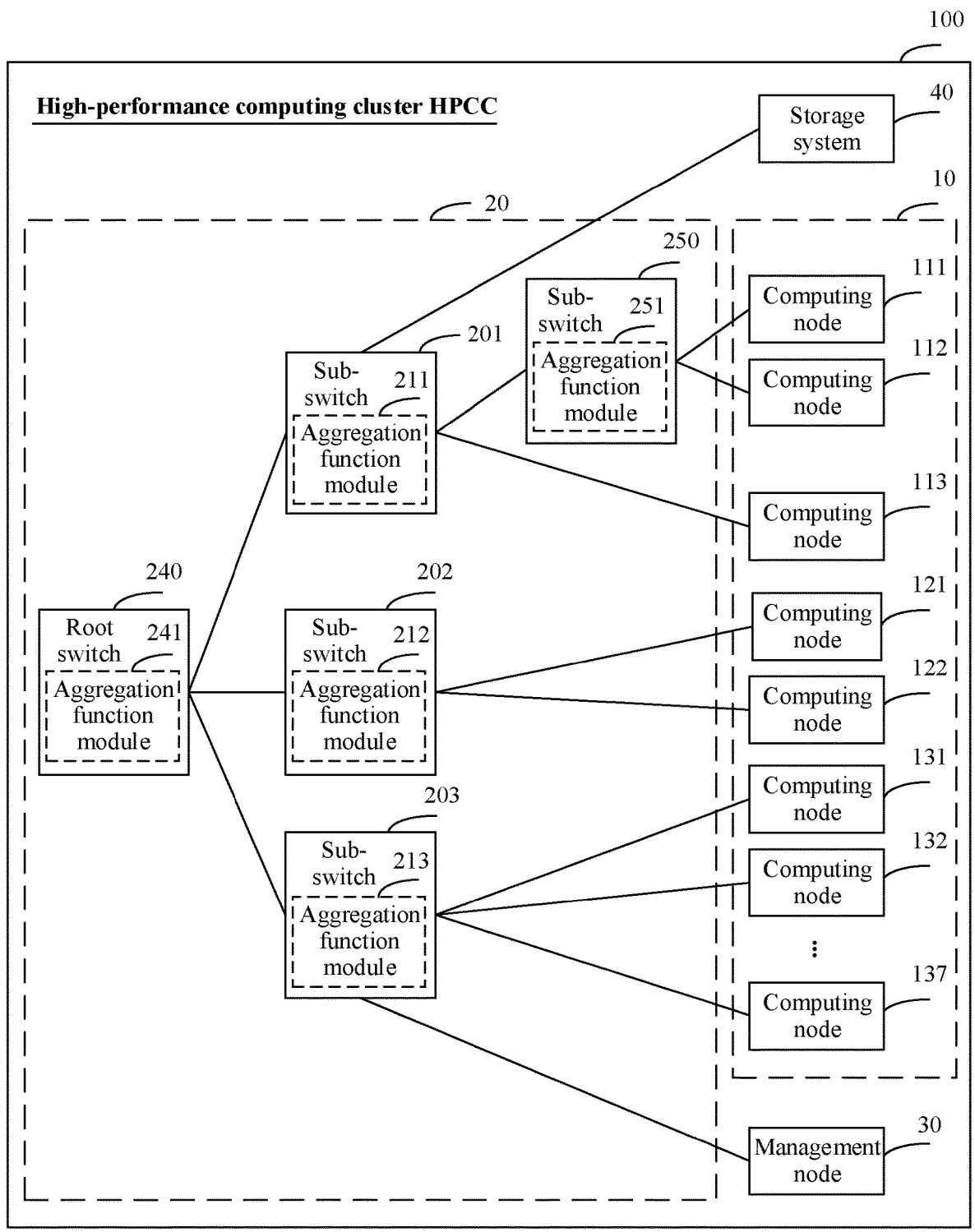
FIG. 1 is a schematic diagram of a logical structure of an HPCC 100 according to this application.

The technical solutions to be protected in this application are described below with reference to the accompanying drawings.

With the arrival of the information age, a large amount of data is generated in every industry at every moment. There are usually specific rules and trends hidden in the large amount of generated data, and the rules and trends play an important role in many fields. Therefore, in many fields, massive data in the fields needs to be analyzed and processed. Currently, a cluster such as a high-performance computing cluster or an artificial intelligence cluster is usually used to analyze and process the massive data. A working process of the HPCC is described by using numerical weather forecasting as an example. In numerical weather forecasting, a mathematical and physical equation set representing an atmospheric motion state is solved under a specific initial condition by using a numerical method, to calculate a possible change in an atmospheric quantity or field (for example, a temperature, a wind direction, a wind speed, and humidity), so as to deduce a weather condition in a future period of time from a current weather condition. In numerical weather forecasting, quality check and assimilation analysis need to be performed on a large amount of observation data to obtain the initial condition, and there is a very large amount of calculation in a processing process. In addition, a large amount of calculation is required to numerically solve a governing partial differential equation set with millions of degrees of freedom. In addition, numerical weather forecasting needs to be completed in as short a time as possible, and it needs to take a long time when calculation is manually performed and performed by using an ordinary computer. Consequently, a requirement of a numerical weather forecasting service for high timeliness cannot be met. Therefore, a cluster such as the HPCC needs to be used in a scenario in which there is a large amount of data and a complex computing task, for example, numerical weather forecasting. Fields to which the HPCC is applied may include but are not limited to the following fields: numerical weather forecasting and biomolecular research and genetic engineering computation in biological science or life science. For another example, fields to which the AI cluster is applied may include but are not limited to fields in which a computer can be enabled to more intelligently and visually simulate some thinking processes and intelligent behaviors of a human.

The cluster processes a large-scale computing task by using a powerful comprehensive computing capability obtained by aggregating a plurality of computing nodes, for example, processes a data-intensive computing task that cannot be independently processed by an ordinary workstation. A principle of processing a computing task by the cluster is as follows: The cluster divides a computing task into several computing subtasks, and allocates a computing subtask to each computing node, and all the computing nodes simultaneously run and process corresponding computing subtasks, to effectively shorten a computing time required for completing the entire computing task.

In some computing tasks, to-be-aggregated data of computing nodes needs to be aggregated, and a final aggregation result needs to be distributed to each computing node. The to-be-aggregated data may be specifically data of a data type corresponding to the computing task, and the data type corresponding to the computing task includes but is not limited to an integer type, a floating-point type, or a Boolean type, in other words, the to-be-aggregated data may be integer data, floating-point data, or Boolean data. Aggregation refers to a process of combining a plurality of pieces of to-be-aggregated data of computing nodes to obtain one piece of data. The process of combining a plurality of pieces of to-be-aggregated data may be specifically as follows: A mathematical formula operation is performed on the plurality of pieces of to-be-aggregated data, for example, the plurality of pieces of to-be-aggregated data are added to obtain a sum as an aggregation result.

In this application, the cluster is configured to process a data-intensive task. The cluster may specifically include a storage system, a management node, and a plurality of nodes. The plurality of nodes include a switch and a computing node, and the switch may include one root switch and a plurality of sub-switches.

A logical structure of the cluster is described below by using the HPCC as an example.

FIG. 1 is a schematic diagram of a logical structure of an HPCC 100 according to this application. As shown in the figure, the HPCC 100 includes a computing node set 10, a switch set 20, a management node 30, and a storage system 40. The computing node set 10 includes a total of 12 computing nodes: a computing node 111, a computing node 112, a computing node 113, a computing node 121, a computing node 122, a computing node 131, . . . , and a computing node 137. The switch set 20 includes a sub-switch 250, a sub-switch 201, a sub-switch 202, a sub-switch 203, and a root switch 240. Each computing node is connected to the root switch by using at least one level of sub-switch. For example, the computing node 111 is connected to the root switch 240 by using two levels of sub-switches: the sub-switch 250 and the sub-switch 201. For another example, the computing node 113 is connected to the root switch 240 by using one level of sub-switch: the sub-switch 201. It should be noted that in the HPCC 100, a quantity of computing nodes included in the computing node set 10, a quantity of switches included in the switch set 20, a connection relationship between each computing node and the sub-switch, a connection relationship between sub-switches, and a cascaded deployment manner between the sub-switch and the root switch constitute no limitation on the technical solutions to be protected in this application, and may be flexibly set based on an actual requirement in a specific implementation process.

In the HPCC 100, the management node 30 is configured to publish a computing task to each computing node in response to an aggregation indication of a user application program. Each computing node is configured to send aggregated data to an upper-level sub-switch directly connected to the computing node. The sub-switch is configured to receive to-be-aggregated data sent by a lower-level computing node or sub-switch directly connected to the sub-switch, and is further configured to: perform an aggregation operation on the received to-be-aggregated data to obtain an aggregation result, and send the obtained aggregation result to a directly connected upper-level sub-switch or the root switch. The root switch 240 is configured to receive to-be-aggregated data sent by a lower-level sub-switch directly connected to the root switch 240, and is further configured to perform an aggregation operation on the received to-be-aggregated data to obtain an aggregation result. In this case, when there is no timeout node in the HPCC 100, the aggregation result obtained by the root switch 240 is a final aggregation result, and the root switch 240 is further configured to notify all computing nodes of the obtained aggregation result. When there is a timeout node in the HPCC 100, the root switch 240 is further configured to send the obtained aggregation result to a timeout aggregation node, to provide a data basis for the timeout aggregation node to perform final aggregation. Each sub-switch is a switch for which one side is directly connected to or connected to a computing node by using another sub-switch, and the other side is directly connected to or connected to the root switch by using another sub-switch.

The root switch 240 is a switch to which the sub-switch is finally aggregated and connected.

In the HPCC 100, the management node 30 may be deployed at any position in the HPCC 100. For example, the management node 30 is connected to the root switch 240 by using the sub-switch 203. The storage system 40 may be deployed at any position in the HPCC 100. For example, the storage system 40 is connected to the root switch 240 by using the sub-switch 201.

It should be noted that in the HPCC 100, each computing node may be specifically a processor, a processor core, or a server that has a computing capability. The sub-switch and the root switch may be specifically any types of switches that have a data exchange function and an aggregation function. The management node may be specifically a processor, a processor core, or a server that has a capability of managing the cluster. The storage system 40 may specifically refer to storage space or a storage chip that has a storage function.

This application provides a data processing method. The method is applied to a cluster that processes a data-intensive computing task. When there is a relatively large time difference in receiving, by a sub-switch, to-be-aggregated data sent by directly connected lower-level computing nodes or sub-switches, or when there is a relatively large time difference in receiving, by a root switch, to-be-aggregated data sent by directly connected lower-level sub-switches, to-be-aggregated data with a relatively large delay does not need to be waited for, but a partial aggregation operation is performed on partial to-be-aggregated data, and after partial aggregated data obtained by performing the partial aggregation operation is sent, a network resource that is of the sub-switch or the root switch and that is occupied for a thread or process used to perform the current aggregation operation may be released. In addition, only one timeout aggregation node needs to continue to wait for the to-be-aggregated data with a relatively large delay and perform a final aggregation operation, to complete final aggregation. It may be learned that in this application, obtaining of a final aggregation result by the user application program is not affected, and a problem that network resources of a plurality of sub-switches and the root switch are occupied for a long time in an aggregation operation processing period is avoided, to improve data aggregation processing efficiency in the cluster.

In the technical solutions provided in this application, in the root switch and each sub-switch in the cluster, there is an aggregation function module, and a time threshold is preset. The aggregation function module can perform an aggregation operation on received to-be-aggregated data to obtain an aggregation result. The time threshold is maximum duration in which the root switch or the sub-switch continues to wait to receive to-be-aggregated data from a directly connected lower-level node. Specifically, timing is started when the root switch or the sub-switch receives first to-be-aggregated data. After the time threshold passes, the root switch or the sub-switch no longer waits for other to-be-aggregated data that is not received, and partially aggregates received to-be-aggregated data by using the aggregation function module. It should be noted that there may be a same time threshold or a different time threshold for the root switch or each sub-switch. This is not specifically limited in this application. A node that receives no to-be-aggregated data within the time threshold is referred to as a timeout node. There may be one or more timeout nodes in one time of aggregation, and the timeout node may be a computing node or a sub-switch.

In addition, the root switch and each sub-switch in the cluster further include a bypass module. The bypass module may mean that storage space is reserved in the switch, for example, a register in the switch is used as the reserved storage space, and the bypass module in the root switch or the sub-switch is configured to record, in the reserved storage space, a timeout status of the lower-level node directly connected to the root switch or the sub-switch. For example, when a timeout occurs on a computing node, a bypass module in an upper-level sub-switch directly connected to the computing node establishes, in reserved storage space, a bypass entry corresponding to the timeout node. The bypass entry may specifically include an identifier of the timeout node and an identifier of an aggregation command, and is used to indicate that a timeout occurs when the timeout node executes the aggregation command.

Furthermore, when there is a timeout aggregation node in the cluster, the timeout aggregation node is configured to perform a final aggregation operation when there is a timeout node. The timeout aggregation node may be any node that has an aggregation function in the cluster. For example, the timeout aggregation node may be any computing node or any switch. For another example, the timeout aggregation node may alternatively be a dedicated node that is specifically configured to perform final aggregation when there is a timeout node. The timeout aggregation node obtains first data obtained by the root switch through aggregation, where the first data is partial aggregated data that carries an identifier of a timeout node, and further obtains second data sent by each timeout node, to aggregate the first data and second data corresponding to all the timeout nodes to obtain final complete aggregated data. Then, the timeout aggregated node uses the complete aggregated data as a final aggregation result, and notifies each computing node of the final aggregation result. For a specific policy for selecting the timeout aggregation node, refer to related description in a method embodiment shown in FIG. 3.

The data processing method provided in this application is described below in detail with reference to the accompanying drawings.

Figure 2:
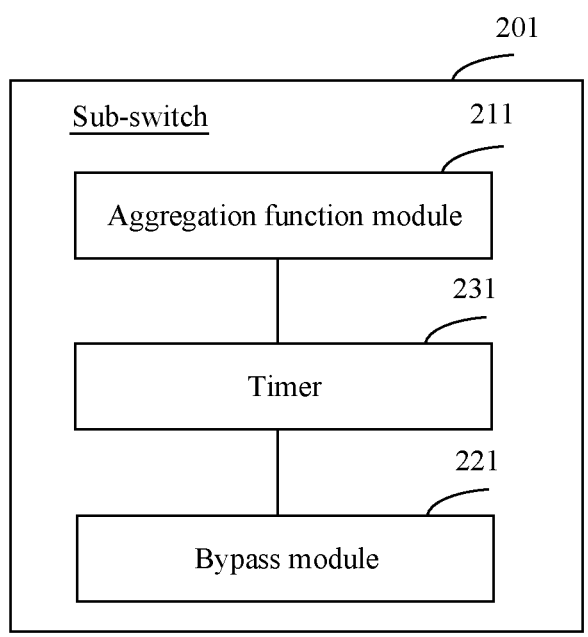
FIG. 2 is a schematic diagram of a logical structure of a sub-switch 201 according to this application.

A sub-switch or a root switch in a cluster is described by using the sub-switch 201 in FIG. 1 as an example. FIG. 2 is a diagram of a logical structure of a sub-switch 201 according to an embodiment of this application. In comparison with the sub-switch 201 in FIG. 1, a bypass module 221 and a timer 231 are added. The bypass module 221 is configured to write a corresponding bypass entry in reserved storage space when the sub-switch 201 determines that a timeout occurs on a directly connected computing node. A value of the timer 231 is a time threshold. When an aggregation operation is started, the timer 231 in the sub-switch 201 starts timing when first to-be-aggregated data is received. In a case, when to-be-aggregated data sent by all directly connected lower-level nodes is received within the time threshold, the timer 231 is reset, and an aggregation function module 211 is triggered to aggregate all the to-be-aggregated data to obtain an aggregation result. Alternatively, in another case, when to-be-aggregated data sent by all directly connected lower-level nodes is still not received when the timer 231 reaches the time threshold, the timer 231 is reset, an aggregation function module 211 is triggered to aggregate the received to-be-aggregated data to obtain a partial aggregation result, and the bypass module 221 is triggered to establish a bypass entry in the reserved storage space. In addition, the sub-switch 201 further includes a communication module (not shown in FIG. 2), configured to implement information exchange between the sub-switch 201 and another device. For example, the communication module is configured to receive the to-be-aggregated data from the directly connected lower-level node, is further configured to send the aggregation result obtained by the aggregation function module 211 to a root switch 240, and is further configured to send, to a timeout aggregation node, to-be-aggregated data sent by a timeout node.

The data processing method provided in this application and a cluster to which the data processing method is applicable are described above by using the HPCC 100 as an example. This application is further applicable to another cluster, for example, an AI cluster. A data processing method and a cluster result in the AI cluster are similar to those described above. A feature of the AI cluster and a difference from the HPCC in a data processing process are briefly described below.

For example, a structure of a distributed training architecture commonly used in the AI cluster is a parameter server (PS) architecture. The PS architecture may specifically include a parameter server connected to a plurality of computing nodes. For the AI cluster, the parameter server is configured to: store a parameter of a model, aggregate to-be-aggregated data (which is also referred to as gradients) returned by computing nodes, update the parameter of the model by using an aggregation result, and broadcast an updated parameter of the model to each computing node. Each computing node calculates a gradient of the parameter of the model based on the parameter of the model sent by the parameter server, uses the gradient as to-be-aggregated data, sends the to-be-aggregated data to the parameter server, and so on, to train the parameter of the model. It should be noted that the parameter is the model, and the gradient is a coefficient for updating the parameter of the model.

The parameter server and each computing node are connected by using a switch. Therefore, in the PS architecture, a logical structure between the computing node and the switch is similar to that shown in FIG. 1. A root switch 240 may be connected to the parameter server. In this way, to relieve a burden of the parameter server, a gradient aggregation function of the parameter server is offloaded to each level of switch for execution. Therefore, differences between the AI cluster and the HPCC shown in FIG. 1 are as follows: 1. The to-be-aggregated data is a gradient. 2. Each computing node is not notified of a final aggregation result, but is notified of a new parameter of the model that is obtained after the parameter server updates the parameter of the model by using the final aggregation result. 3. Each computing node needs to perform calculation on the received new parameter of the model to obtain a corresponding gradient, uses the calculated gradient as to-be-aggregated data, and sends the to-be-aggregated data to a directly connected sub-switch.

The data processing method provided in this application is described below in detail by using the HPCC 100 shown in FIG. 1 as an example and with reference to FIG. 3. The method is applied to a timeout aggregation node in the HPCC 100, and the HPCC 100 may process a data-intensive computing task. When an aggregation operation needs to be performed, a user application program may indicate any computing node in the HPCC 100 to apply for a network aggregation resource from a management node 30, and the management node 30 initiates aggregation in the HPCC 100 in response to the application, and then the management node 30 sends the network aggregation resource obtained through application to each computing node in the HPCC 100. Based on this, each computing node sends to-be-aggregated data, and waits to receive a final aggregation result of the current aggregation operation. In this embodiment, description is provided by using, as an example, an aggregation process (namely, a process in which each computing node sends the to-be-aggregated data, and waits to receive the final aggregation result of the current aggregation operation) that exists when there is a timeout node.

In this embodiment, the timeout aggregation node is specifically a node that is determined by a root switch 240 and/or the management node 30 and that is configured to complete a final aggregation operation when there is a timeout node. The timeout aggregation node may be any node that is in the HPCC 100, that can communicate with the root switch 240, and that has an aggregation function, for example, may be any computing node, any sub-switch, the root switch, or the management node.

In an example, the management node 30 or the root switch 240 may select a node as the timeout aggregation node from all nodes. If the management node 30 determines the timeout aggregation node, the management node 30 further needs to synchronize information about the determined timeout aggregation node to the root switch 240. In another example, the management node 30 and the root switch 240 may jointly determine the timeout aggregation node. A specific process may include: The management node 30 first selects at least one node as a candidate timeout aggregation node from all nodes, and then the management node 30 synchronizes information about the candidate timeout aggregation node to the root switch 240, and then the root switch 240 selects a node as the finally selected timeout aggregation node from the at least one candidate timeout aggregation node.

A selection policy for determining the timeout aggregation node by the management node 30 or the root switch 240 and a selection policy for determining the finally selected timeout aggregation node from the at least one candidate timeout aggregation node by the switch 240 include but are not limited to at least one of the following cases:

Case 1: A fixed node is selected as the timeout aggregation node.

Case 2: A node is randomly selected as the timeout aggregation node based on an identifier of each node in the cluster.

Case 3: A node is determined as the timeout aggregation node based on a network load status of each node. For example, a node with lightest network load is selected as the timeout aggregation node.

Case 4: A node is determined as the timeout aggregation node based on a quantity of hops between each node and the root switch 240 or link overheads. For example, a node corresponding to a smallest quantity of hops from the root switch 240 or lowest link overheads is selected as the timeout aggregation node. The quantity of hops between the node and the root switch 240 is a quantity of network devices through which a packet of the node passes for transmission from the node to a root node.

In addition, the timeout aggregation node may alternatively be a dedicated node directly connected to the root switch 240. The dedicated node does not perform another operation in the HPCC 100, is not allocated a computing task, and is specifically responsible for completing a final aggregation operation when there is a timeout node in an aggregation process in the HPCC 100.

Figure 3:
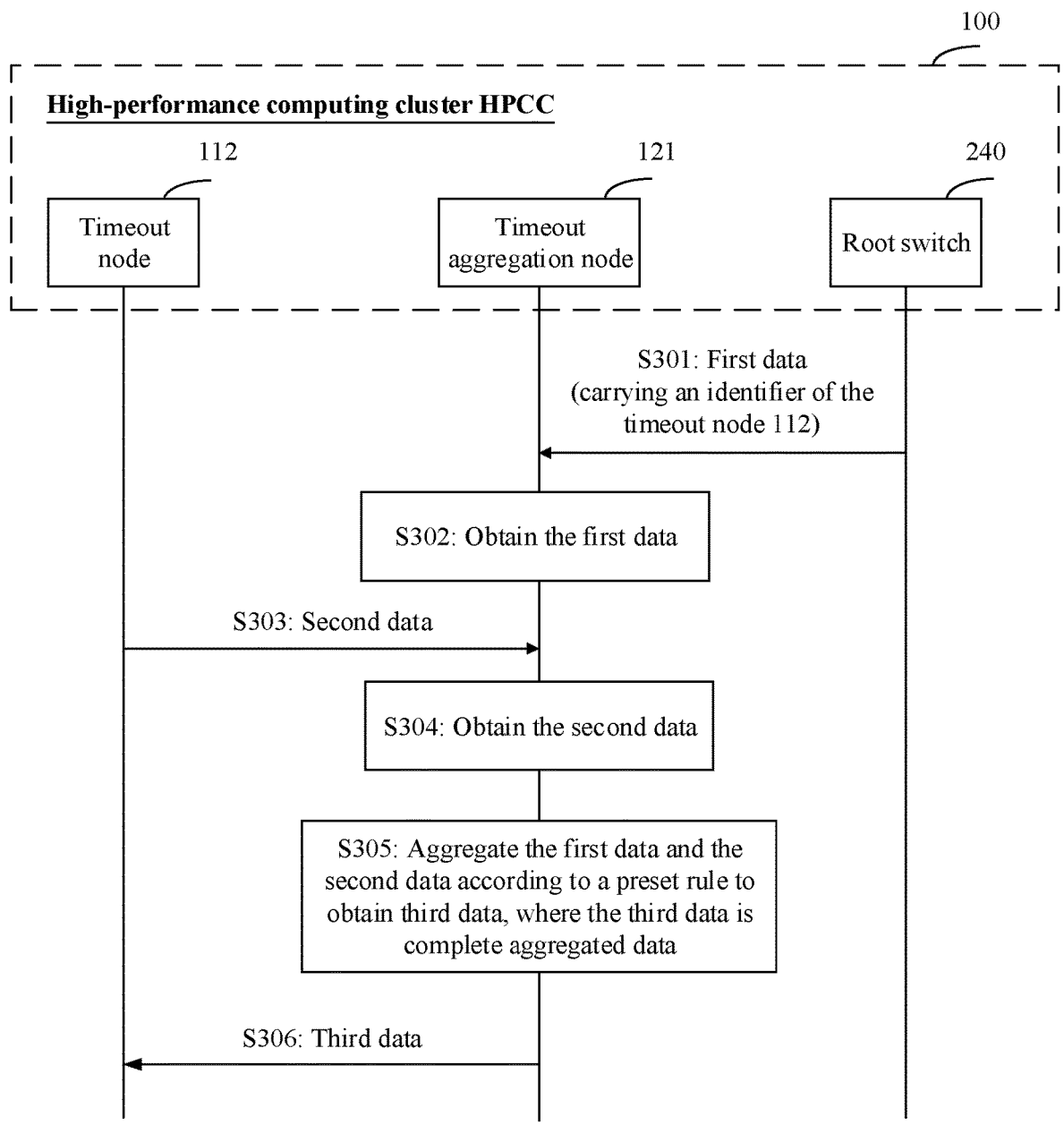
FIG. 3 is an interaction diagram of a procedure of a data processing method according to this application.

In the method shown in FIG. 3, description is provided by using an example in which the timeout aggregation node is a computing node 121 and the timeout node is a computing node 112. As shown in FIG. 3, the method includes the following steps.

S301: The root switch 240 sends first data to the timeout aggregation node 121, where the first data is partial aggregated data in the computing data-intensive computing task, the first data carries a first identifier of the timeout node 112, and the first identifier is used to indicate that a timeout occurs on the timeout node 112.

S302: The timeout aggregation node 121 obtains the first data.

The timeout node may be specifically determined based on a locally preset time threshold by a sub-switch or the root switch directly connected to the timeout node; and/or determined by the management node based on an aggregation status of each computing node in a historical aggregation operation.

In some possible implementations, if the timeout node 112 is determined by a sub-switch 250 based on a local time threshold, a process in which the root switch 240 obtains the first data may include: S21: The root switch 240 separately receives first aggregated data, second aggregated data, and third aggregated data sent by a sub-switch 201, a sub-switch 202, and a sub-switch 203; and S22: The root switch 240 aggregates the first aggregated data, the second aggregated data, and the third aggregated data according to a preset rule to obtain the first data. The first aggregated data carries the first identifier of the timeout node 112, and therefore the first data also carries the first identifier of the timeout node 112. There is no timeout node in computing nodes directly connected to the sub-switch 202 and the sub-switch 203. Therefore, both a process in which the sub-switch 202 obtains the second aggregated data and a process in which the sub-switch 203 obtains the third aggregated data are the same as the process in which the root switch 240 obtains the first data. Although no timeout occurs on a computing node 113 directly connected to the sub-switch 201, a timeout occurs on the computing node 112 connected to the sub-switch 201 by using the sub-switch 250. Therefore, a process in which the sub-switch 201 obtains the first aggregated data may include: S31: The sub-switch 250 receives, within the time threshold, only data a sent by a computing node 111, and the sub-switch 250 determines that a timeout occurs on the computing node 112; S32: The sub-switch 250 adds an identifier of the timeout node 112 to the data a, and sends the data a to which the identifier of the timeout node 112 is added to the sub-switch 201; S33: The sub-switch 250 adds a bypass entry in reserved storage space, where the bypass entry includes an identifier of an aggregation command X and the identifier of the timeout node 112, and is used to indicate that a timeout occurs when the timeout node 112 executes the aggregation command X; S34: The sub-switch 201 receives, within a time threshold, the data a and data c sent by the computing node 113; and S35: The sub-switch 201 aggregates the data a and the data c according to the preset rule to obtain the first aggregated data. The data a carries the first identifier of the timeout node 112, and therefore the first aggregated data also carries the first identifier of the timeout node 112. It should be noted that a sequence of performing S33 and S34 is not limited, and S33 and S34 may be sequentially or simultaneously performed.

The time threshold is used to limit waiting duration in which the root switch or the sub-switch receives to-be-aggregated data. Starting from a time at which the root switch or the sub-switch receives first to-be-aggregated data, if no to-be-aggregated data is received within the time threshold, a node that receives no to-be-aggregated data may be considered as a timeout node. Time thresholds for the root switch and all the sub-switches may be the same, may be different, or may be partially the same (for example, a same time threshold is set for sub-switches at a same level).

The bypass entry is usually generated only on the sub-switch 250 directly connected to the timeout node 112, and the bypass entry does not need to be synchronously recorded at another node.

In some other possible implementations, if the timeout node 112 is determined by the management node 30 based on a delay status of each node in the historical aggregation operation, a process in which the root switch 240 obtains the first data is the same as that in S21 and S22, and a difference is a process in which the sub-switch 201 obtains the first aggregated data. The root switch 240 and each sub-switch perform an aggregation operation based on locally configured aggregation node bitmaps. An initial bitmap may be determined based on a connection relationship between the root switch 240 and each sub-switch in the HPCC 100. For example, an initial bitmap on the sub-switch 250 indicates that nodes that participate in aggregation on the sub-switch 250 include a computing node 111 and the computing node 112. In this case, the process in which the sub-switch 201 obtains the first aggregated data may include: S41: When the management node 30 determines that the timeout node is the computing node 112, the management node 30 may modify the bitmap on the sub-switch 250, and set a flag bit of the computing node 112 in the bitmap to be invalid, where in this case, the bitmap on the sub-switch 250 is used to indicate that a computing node that participates in aggregation on the sub-switch 250 is the computing node 111; S42: The management node 30 notifies that the computing node 112 is a timeout node; S43: The timeout node 112 adds a timeout flag bit of the timeout node 112 to data b, where the timeout flag bit is used to indicate that the data b is to-be-aggregated data of the timeout node 112, and participates in aggregation at the timeout aggregation node 121; S44: The sub-switch 250 receives data a sent by the computing node 111 and the data b sent by the computing node 112; S45: Based on the local bitmap, the sub-switch 250 sends the data a to the sub-switch 201, and bypasses and sends the data b to the timeout aggregation node 121; S46: The sub-switch 201 receives the data a and data c sent by a computing node 113; and S47: The sub-switch 201 aggregates the data a and the data c according to a preset rule to obtain the first aggregated data. The data a carries the first identifier of the timeout node 112, and therefore the first aggregated data also carries the first identifier of the timeout node 112. It should be noted that for related description of the case in which the sub-switch 250 bypasses and sends the data b to the timeout aggregation node 121 in S43 and S45, refer to related description in S303.

The timeout node 112 determined by the management node 30 may not be a node with a relatively large delay in any one or more aggregation operations before the current aggregation operation, and there is a relatively high probability that there is a relatively large delay for the timeout node 112 in the current aggregation operation. A method for determining the timeout node 112 by the management node 30 based on the delay status of each node in the historical aggregation operation includes but is not limited to the following method: The management node 30 calculates, by using times of receiving first data by the sub-switch 250, the sub-switch 201, the sub-switch 202, and the sub-switch 203 in a preset quantity of historical aggregation operations as reference times, time differences in respectively receiving data from directly connected computing nodes by the sub-switch 250, the sub-switch 201, the sub-switch 202, and the sub-switch 203, and determines that a preset quantity of computing nodes corresponding to a maximum time difference are timeout nodes, or determines that a computing node corresponding to a time difference greater than preset duration (for example, 4 seconds) is a timeout node. The historical aggregation operation is any one or more aggregation operations before the current aggregation operation. For example, if the management node 30 finds that in first two aggregation operations, time differences in receiving data by the sub-switch 250, the sub-switch 201, the sub-switch 202, and the sub-switch 203 are respectively 0 seconds, 2.1 seconds, 4.5 seconds, 1.3 seconds, 0.5 seconds, 0.5 seconds, 0.3 seconds, 1.5 seconds, 6 seconds, 2 seconds, 3 seconds, and 4 seconds, the management node 30 may determine that a computing node 134 corresponding to a largest time difference is a timeout node, or the management node 30 may determine that the computing node 113 and a computing node 134 corresponding to time differences that exceed 4 seconds are timeout nodes.

In some other possible implementations, the timeout node may alternatively be jointly determined by the root switch, each level of sub-switch, and the management node 30. That is, before the aggregation operation, the management node 30 determines the timeout node based on a delay status of each node in a historical aggregation operation. In an aggregation operation process, the sub-switch or the root switch determines, based on an actual data receiving status, a timeout node that receives no to-be-aggregated data within a time threshold. In this case, to-be-aggregated data sent by a timeout node determined by using a mechanism may be separately processed based on the corresponding mechanism. Details are not described herein.

In the foregoing implementations, a manner of triggering the sub-switch or the root switch 240 to perform an aggregation operation includes any one of the following manners:

Manner 1: To-be-aggregated data sent by all direct connected lower-level nodes is received, or an aggregation operation on received to-be-aggregated data is started if a time threshold passes after first to-be-aggregated data is locally received.

For example, the aggregation operation is started after the data sent by all the directly connected lower-level nodes is received within first duration. That is, provided that the switch 202 determines, within the first duration, that data d0, data e0, and data f0 respectively sent by the computing node 121, a computing node 122, and a computing node 123 are received, execution of S305 is triggered.

Manner 2: Each time new to-be-aggregated data is received, an aggregation operation is performed based on a previous aggregation result, until an aggregation operation on to-be-aggregated data sent by all direct lower-level nodes is completed, or until a time threshold passes after first to-be-aggregated data is received.

It should be noted that the data may be carried in a payload of any packet, and a receiver parses the received packet to obtain the data carried in the payload of the packet. For example, the data may be carried in a payload of a remote direct memory access (RDMA) packet. In an example, the packet used to carry the data may be specifically sent in a format of a collective communication protocol. For example, in the HPCC, the collective communication protocol for the packet used to carry the data may include a message passing interface (MPI) standard. MPI is a basic software environment for communication between nodes. The MPI provides an application programming interface (API) for performing an operation such as communication or synchronization between related processes, and may be considered as a basic library for parallel computing.

In S301, for the root switch 240, to enable the receiver, namely, the timeout aggregation node 121, to know that the first data is partial aggregated data, the root switch 240 needs to add the identifier of the timeout node 112 to the first data before sending the first data to the timeout aggregation node 121. The identifier of the timeout node 112 may be any information that can identify the timeout node 112. For example, the identifier of the timeout node 112 may be a number 112 of the timeout node 112, or may be a hardware sequence number of the timeout node 112.

In an example, if the aggregation operation is specifically to add to-be-aggregated data, the identifier of the timeout node 112 is 112, and the first data is sent to the timeout aggregation node 121 by using an RDMA packet. In this case, a value carried in a payload of the RDMA packet is equal to a value of the first data, and a reserved field in a packet header of the RDMA packet carries 112, and is used to notify the timeout aggregation node 121 that the received first data is partial aggregated data, and the computing node 112 is a timeout node.

When the timeout aggregation node is any computing node, a sub-switch, the management node, or a dedicated node directly connected to the root switch, S302 is specifically as follows: The timeout aggregation node receives the first data from the root switch 240.

When the timeout aggregation node is the root switch, S302 is specifically as follows: The timeout aggregation node aggregates a plurality of pieces of data that are sent by a directly connected sub-switch and that carry no timeout flag bit, to obtain the first data.

For each sub-switch and the root switch, regardless of whether a timeout occurs on a lower-level node directly connected to the sub-switch or the root switch, when an aggregation result is sent to a directly connected upper-level sub-switch or the root switch, a network resource of the sub-switch occupied for a thread or process used by the sub-switch to perform the current aggregation operation may be released, the network resource does not need to be occupied for a long time to wait for to-be-aggregated data of the timeout node, and the released network resource may be used to perform another operation, thereby greatly improving aggregation processing efficiency.

S303: The timeout node 112 sends second data to the timeout aggregation node 121, where the second data is to-be-aggregated data sent by the timeout node 112.

S304: The timeout aggregation node 121 obtains the second data.

It should be noted that the second data and the data b represent same data, and both are to-be-aggregated data sent by the timeout node 112.

In an example, the second data may include a timeout flag bit, and the timeout flag bit is used to indicate that the second data is to-be-aggregated data of the timeout node 112, and participates in aggregation at the timeout aggregation node 121. Another node that receives the second data may only need to bypass and forward the second data.

When the timeout node 112 is determined by the sub-switch 250 based on the locally preset time threshold, the timeout flag bit in the second data is generated based on a local bypass entry by the sub-switch 250 directly connected to the timeout node 112 and added to the second data. The bypass entry is generated in locally preset storage space after the sub-switch 250 determines that a timeout occurs on the timeout node 112. The bypass entry is used to indicate a correspondence between the timeout node 112 and the aggregation command X, and may specifically include the identifier of the timeout node 112 and the identifier of the aggregation command X. In specific implementation, a process in which the timeout node 112 sends the second data to the timeout aggregation node 121 may include: The timeout node 112 separately sends the second data to the timeout aggregation node 121 by using the sub-switch 250, the sub-switch 201, the root switch 240, and the sub-switch 202. If the sub-switch 250 directly connected to the timeout node 112 and the timeout aggregation node 121 may communicate through another path, the second data may be sent to the timeout aggregation node 121 through the another path. When the second data arrives at the sub-switch 250, the sub-switch 250 matches the second data with the bypass entry, determines that the second data is to-be-aggregated data sent by the timeout node 112 in an aggregation operation X, adds a bypass flag bit to the second data, and then continues to bypass and forward the second data to which the bypass flag bit is added.

It should be noted that to save storage space to ensure that a bypass entry generated in each aggregation operation does not affect a subsequent aggregation operation and each aggregation operation can be effectively performed, after receiving the second data sent by the timeout node, the root switch 240 or the sub-switch that includes the bypass entry adds the timeout flag bit to the second data based on the bypass entry corresponding to the timeout node, and then may delete the bypass entry. The timeout flag bit may also be referred to as a bypass flag bit.

When the timeout node 112 is determined by the management node 30 based on the aggregation status of each computing node in the historical aggregation operation, the timeout flag bit in the second data is added by the timeout node 112 to the second data. In specific implementation, a process in which the timeout node 112 sends the second data to the timeout aggregation node 121 may include: The timeout node 112 separately sends the second data to which the bypass flag bit is added to the timeout aggregation node 121 by using the sub-switch 250, the sub-switch 201, the root switch 240, and the sub-switch 202.

It should be noted that the second data is carried in a packet, the timeout flag bit is defined in a reserved field in a packet header of the packet, and a value of the reserved field is used to indicate the timeout node 112 that generates the second data. In an example, if the second data is sent to the timeout aggregation node 121 by using an RDMA packet, a value carried in a payload of the RDMA packet is equal to a value of the second data, and a reserved field in a packet header of the RDMA packet carries the timeout flag bit, and is used to notify the timeout aggregation node 121 that the received second data is to-be-aggregated data of the timeout node 112, and an aggregation operation needs to be performed at the timeout aggregation node 121.

It should be noted that after S301 to S304 are performed, the timeout aggregation node 121 receives the first data and the second data, to provide a data basis for completing final aggregation.

It should be noted that a sequence of performing S301 and S302 and S303 and S304 is not limited, and S301 and S302 and S303 and S304 may be sequentially or simultaneously performed.

S305: The timeout aggregation node 121 aggregates the first data and the second data according to a preset rule to obtain third data, where the third data is complete aggregated data.

In specific implementation, S305 may specifically include: S51: Determine data types of the first data and the second data; and S52: When an aggregation result of the data types is unrelated to an aggregation sequence, aggregate the first data and the second data based on an obtaining sequence, to obtain the third data; or S53: When an aggregation result of the data types is related to an aggregation sequence, aggregate the first data and the second data based on a preset aggregation sequence, to obtain the third data.

Whether an aggregation result is related to an aggregation sequence depends on a data type of to-be-aggregated data. That an aggregation result of data types is unrelated to an aggregation sequence means that the aggregation result does not change with the aggregation sequence. For example, if the to-be-aggregated data is integer data, the aggregation sequence may not be considered, and the received to-be-aggregated data is aggregated in any sequence. Correspondingly, that an aggregation result of data types is related to an aggregation sequence means that the aggregation result changes with the aggregation sequence. For example, the to-be-aggregated data is floating-point data. It may be understood that during calculation of the floating-point data, a computer describes the floating-point data in a format of "significant figure bit+exponential bit". For example, $\frac{1}{3} + \frac{2}{3} + \frac{2}{3} = (3.333*10^{-1} + 6.667*10^{-1}) + 6.667*10^{-1} = 1.000*100 + 6.667*10^{-1} = 1.667*100$, where 1.667 is obtained by rounding off 1.6667. However, $\frac{2}{3} + \frac{2}{3} + \frac{1}{3} = (6.667*10^{-1} + 6.667*10^{-1}) + 3.333*10^{-1} = 1.333*100 + 3.333*10^{-1} = 1.666*100$, where 1.666 is obtained by rounding off 1.6663. It may be learned that for the floating-point data, if the aggregation sequence is reversed, a different aggregation result is obtained. Therefore, aggregation needs to be strictly performed based on a preset aggregation sequence.

There are different requirements for precision of the aggregation result in different application scenarios. Therefore, in this embodiment of this application, whether an aggregation operation needs to be strictly performed based on the preset sequence may be further determined based on a precision requirement of a cluster. For example, for an AI cluster, gradients are aggregated, and are used to train a parameter of a model, and there is a relatively low precision requirement. Therefore, an aggregation operation may not be strictly performed on to-be-aggregated data of any data type based on the preset sequence. For another example, for the HPCC, there is usually a relatively high requirement for aggregation precision. Therefore, when the aggregation result of the data types (for example, floating-point data) of the to-be-aggregated data is affected by the aggregation sequence, an aggregation operation needs to be strictly performed based on the preset sequence. When the aggregation result of the data types (for example, integer data) of the to-be-aggregated data is not affected by the aggregation sequence, an aggregation operation may not be performed based on the preset sequence.

It should be noted that when the to-be-aggregated data is affected by the aggregation sequence, aggregation by the timeout aggregation node 121 needs to be performed according to the preset rule, and aggregation processes by each sub-switch and the root switch 240 also need to be performed based on the preset aggregation sequence.

In S305, if the to-be-aggregated data is floating-point data, the computing node 112 is a node that last participates in aggregation in the preset aggregation sequence, and the aggregation operation is to perform an addition operation, S305 may be specifically as follows: The timeout aggregation node 121 calculates, based on an aggregation sequence from the first data to the second data, a sum obtained after the first data and the second data are added, and records the sum as the third data.

In S305, if there are a plurality of timeout nodes, a condition for triggering the timeout aggregation node 121 to perform an aggregation operation includes: a condition 1: An aggregation operation on received to-be-aggregated data is started only after a plurality of pieces of second data sent by all the timeout nodes are received and the first data is obtained; and a condition 2: When to-be-aggregated data sent by a timeout node is received, the to-be-aggregated data and the first data are aggregated, and subsequently each time to-be-aggregated data sent by a timeout node is received, an aggregation operation is performed on the to-be-aggregated data and an existing aggregation result, until to-be-aggregated data sent by a last timeout node is received, and the to-be-aggregated data and an existing aggregation result are aggregated to obtain the third data, to complete a final aggregation operation.

S306: The timeout aggregation node 121 notifies each computing node in the cluster of the third data.

In an example, if the timeout aggregation node 121 may directly communicate with each computing node, the timeout aggregation node 121 may directly send the third data to each computing node.

In another example, if the timeout aggregation node 121 can indirectly communicate with each computing node only by using the sub-switch 202, the timeout aggregation node 121 may first send the third data to the sub-switch 202, and then the sub-switch 202 sends the third data to each computing node.

In still another example, if the timeout aggregation node 121 can indirectly communicate with each computing node only by sequentially using the sub-switch 202, the root switch 240, and another level of sub-switch or a plurality of other levels of sub-switches, the timeout aggregation node 121 may first send the third data to the sub-switch 202, then the sub-switch 202 sends the third data to the root switch 240, and the root switch 240 sends the third data to each computing node by using each level of sub-switch.

It may be learned that when a cluster continuously expands in scale, to resolve a problem that there is relatively low aggregation processing efficiency because a network resource of a switch is occupied for a long time in an aggregation operation because of a relatively large transmission delay of some nodes, in the data processing method provided in this embodiment of this application, a node in the HPCC is determined as the timeout aggregation node, the timeout aggregation node waits for the to-be-aggregated data sent by the timeout node, and performs a final aggregation operation, and each level of switch no longer needs to wait for the data sent by the timeout node, and may aggregate, in a short time, to-be-aggregated data for which no timeout occurs, and then send an aggregation result. In this way, duration in which a network resource of each level of switch is occupied in an aggregation operation is shortened, to improve data aggregation processing efficiency.

In addition, to effectively implement aggregation, in this embodiment of this application, a bypass module is further added to the switch, and is configured to: record, in preset storage space, a timeout status of a lower-level node directly connected to the switch, and direct the switch to bypass and forward, to a specified timeout aggregation node, to-be-aggregated data sent by a timeout node, so that the timeout aggregation node can obtain all data for performing a final aggregation operation, to ensure that aggregation processing can be accurately completed. It may be learned that in the data processing method provided in this embodiment of this application, data aggregation processing can be efficiently, accurately, and flexibly completed, to improve resource utilization in the cluster.

In some other possible implementations, when the timeout aggregation node is a node other than the computing node 121, an implementation is the same as the implementation in which the computing node 121 is used as the timeout aggregation node, except that there is a different node that waits for the to-be-aggregated data sent by the timeout node and performs a final aggregation operation.

In some other possible implementations, a timeout may also occur on the timeout aggregation node. In this case, aggregation processing may still be performed by using the data processing method provided in this embodiment of this application, and a difference is a related operation of an upper-level sub-switch or the root switch directly connected to the timeout aggregation node and a related operation of the timeout aggregation node serving as a timeout node. For example, a timeout occurs on the timeout aggregation node 121. In a case, the sub-switch 202 adds an identifier of the timeout node 121 to to-be-aggregated data d sent by the computing node 122, and generates a bypass entry. The bypass entry includes the identifier of the computing node 121 and the identifier of the aggregation command X. Then, after receiving to-be-aggregated data e sent by the computing node 121, the sub-switch 202 determines that the data e matches the bypass entry, and adds a timeout flag bit to the data e. Then, the sub-switch 202 sends data 3 to the computing node 121 for use in a subsequent final aggregation operation. Alternatively, in another case, if the sub-switch 202 knows that a lower-level timeout node directly connected to the sub-switch 202 is the timeout aggregation node 121, an identifier of the timeout node 121 is added only to to-be-aggregated data d sent by the computing node 122, and a bypass entry corresponding to the timeout node 121 is not generated. In addition, the computing node 121 no longer sends data e to the sub-switch 202, and locally stores the data d for use in a subsequent final aggregation operation. A process in which the timeout aggregation node performs the final aggregation operation is the same as that in the embodiment shown in FIG. 3.

It should be noted that in an aggregation operation, when there is no timeout node, all levels of switches perform aggregation level by level, and send an aggregation result, and the root switch completes a final aggregation operation to obtain a final aggregation result, and notifies each computing node in the cluster of the final aggregation result.

In some other possible implementations, in consideration of the fact that a timeout may also occur due to a reason such as link congestion between switches, for a scenario in which the timeout node is a sub-switch, in a case, a bypass entry established on an upper-level sub-switch or the root switch directly connected to the timeout node may include an identifier of the timeout node and the identifier of the aggregation command, and the identifier of the timeout node may be used to indicate the sub-switch on which a timeout occurs. In this way, when subsequently performing the final aggregation operation, the timeout aggregation node needs to wait for to-be-aggregated data sent by the sub-switch on which a timeout occurs, and completes final aggregation. In another case, the root switch knows a topology of the entire cluster, and therefore the bypass entry may further include an identifier of each lower-level computing node directly connected to the sub-switch on which a timeout occurs and the identifier of the aggregation command. In this way, when subsequently performing the final aggregation operation, the timeout aggregation node needs to wait for each piece of to-be-aggregated data sent by each lower-level computing node directly connected to the sub-switch on which a timeout occurs, and completes final aggregation.

The data processing method provided in this application is described above in detail with reference to FIG. 1 to FIG. 3. A data processing apparatus and device provided in this application are described below with reference to FIG. 4 and FIG. 5.

Figure 4:
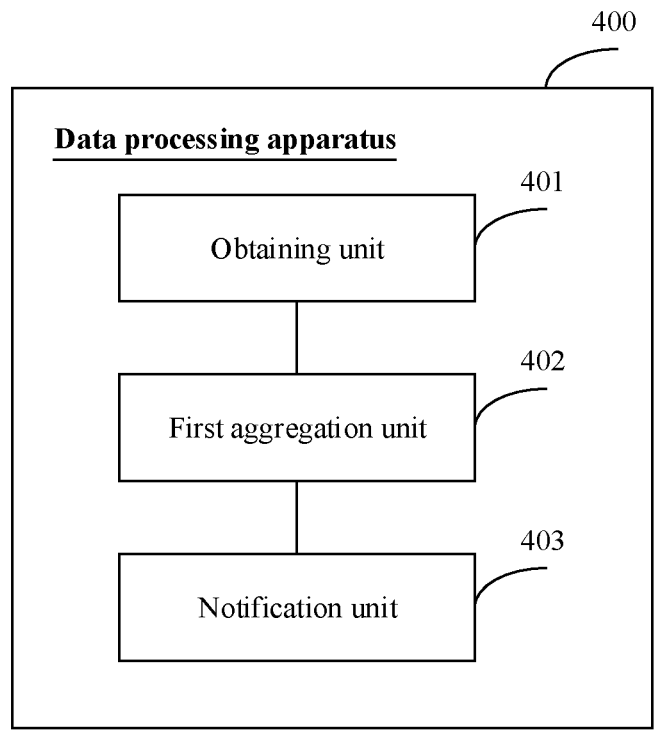
FIG. 4 is a schematic diagram of a structure of a data processing apparatus according to this application.

FIG. 4 shows a data processing apparatus 400 according to this application. The data processing apparatus 400 is applied to a timeout aggregation node in a cluster. The cluster is used for a computing data-intensive computing task. The data processing apparatus 400 includes an obtaining unit 401, a first aggregation unit 402, and a notification unit 403.

The obtaining unit 401 is configured to obtain first data. The first data is partial aggregated data in the computing data-intensive computing task, the first data carries a first identifier of a timeout node, and the first identifier is used to indicate that a timeout occurs on the timeout node.

The obtaining unit 401 is further configured to obtain second data of the timeout node based on the first identifier of the timeout node. The second data is to-be-aggregated data sent by the timeout node.

The first aggregation unit 402 is configured to aggregate the first data and the second data according to a preset rule to obtain third data. The third data is complete aggregated data.

The notification unit 403 is configured to notify each computing node in the cluster of the third data.

Optionally, the first data is data obtained by aggregating all fourth data by a root switch in the cluster after receiving the fourth data sent by all directly connected sub-switches. The fourth data includes the partial aggregated data sent by a sub-switch directly connected to the timeout node.

Optionally, the first aggregation unit 402 includes a first determining subunit, a first aggregation subunit, and a second aggregation subunit.

The first determining subunit is configured to determine data types of the first data and the second data.

The first aggregation subunit is configured to: when an aggregation result of the data types is unrelated to an aggregation sequence, aggregate the first data and the second data based on an obtaining sequence, to obtain the third data.

The second aggregation subunit is configured to: when an aggregation result of the data types is related to an aggregation sequence, aggregate the first data and the second data based on a preset aggregation sequence, to obtain the third data.

Optionally, the timeout node is determined based on a locally preset time threshold by the sub-switch directly connected to the timeout node; or the timeout node is determined by a management node based on an aggregation status of each computing node in a historical aggregation operation.

Optionally, the second data includes a timeout flag bit, and the timeout flag bit is used to indicate that the second data is to-be-aggregated data of the timeout node, and participates in aggregation at the timeout aggregation node.

Optionally, when the timeout node is determined based on the locally preset time threshold by the sub-switch directly connected to the timeout node, the timeout flag bit is generated based on a local bypass entry by the sub-switch directly connected to the timeout node and added to the second data.

Optionally, the bypass entry is generated in local storage space after the sub-switch directly connected to the timeout node determines that a timeout occurs on the timeout node, and the bypass entry is used to indicate a correspondence between the timeout node and an aggregation command.

Optionally, when the timeout node is determined by the management node based on the aggregation status of each computing node in the historical aggregation operation, the timeout flag bit is added to the second data by the timeout node.

Optionally, the timeout aggregation node is a fixed node in the cluster; the timeout aggregation node is a node determined based on a network load status; or the timeout aggregation node is a node randomly selected based on an identifier of each node in the cluster.

Optionally, the timeout aggregation node is a computing node or the management node.

Optionally, the timeout aggregation node is a sub-switch or the root switch.

Optionally, the timeout aggregation node is an upper-level sub-switch or the root switch directly connected to the timeout node.

Optionally, the data processing apparatus 400 further includes a first receiving unit and a second aggregation unit.

The first receiving unit is configured to: at a first moment, receive fifth data sent by a first node, and receive sixth data sent by a second node.

The second aggregation unit is configured to: when data sent by a third node is not received at a second moment, aggregate the fifth data and the sixth data to obtain seventh data. The seventh data carries a second identifier of the third node, and the second identifier is used to indicate that the third node is a timeout node. Duration from the first moment to the second moment exceeds a first threshold. The first node, the second node, and the third node are sub-switches or computing nodes directly connected to the timeout aggregation node.

Optionally, when the data sent by the third node is not received at the second moment, the data processing apparatus 400 further includes a generation unit, configured to generate a bypass entry in reserved storage space. The bypass entry includes an identifier of the third node and an identifier of an aggregation command, and the bypass entry is used to indicate that a timeout occurs when the third node executes the aggregation command.

Optionally, the obtaining unit 401 includes: a receiving subunit, configured to receive, after the second moment, eighth data sent by the third node; a second determining subunit, configured to determine that the eighth data matches the bypass entry; and an adding subunit, configured to add the timeout flag bit to the eighth data to obtain the second data.

Optionally, the data processing apparatus 400 further includes a deletion unit, configured to delete the bypass entry after the timeout flag bit is added to the eighth data to obtain the second data.

Optionally, if a first node, a second node, and a third node are sub-switches or computing nodes directly connected to the timeout aggregation node, and the third node is a timeout node, the apparatus further includes a setting unit, configured to set that the third node does not participate in a partial aggregation operation performed at the timeout aggregation node.

Optionally, the data processing apparatus 400 further includes a second receiving unit and a third aggregation unit.

The second receiving unit is configured to: receive fifth data sent by the first node, and receive sixth data sent by the second node.

The third aggregation unit is configured to aggregate the fifth data and the sixth data to obtain seventh data. The seventh data carries a second identifier of the third node, and the second identifier is used to indicate that the third node is a timeout node.

Optionally, when the timeout aggregation node is a sub-switch, the data processing apparatus 400 further includes a sending unit, configured to send the seventh data to an upper-level sub-switch or the root switch directly connected to the timeout aggregation node.

Optionally, when the timeout aggregation node is a non-root switch, the obtaining unit 401 is configured to receive the first data sent by the root switch in the cluster; or when the timeout aggregation node is the root switch, the obtaining unit 401 is configured to aggregate a plurality of pieces of data that are sent by a directly connected sub-switch and that carry no timeout flag bit, to obtain the first data.

Optionally, the cluster is a high-performance computing cluster or an artificial intelligence cluster.

Optionally, the second data is carried in a packet, the timeout flag bit is defined in a reserved field in a packet header of the packet, and a value of the reserved field is used to indicate the timeout node that generates the second data.

It should be understood that the apparatus 400 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, the data processing method shown in FIG. 3 may be implemented by using software, and the apparatus 400 and the modules in the apparatus 400 may also be software modules.

The data processing apparatus 400 according to this embodiment of this application may correspondingly perform the method described in the embodiments of this application. In addition, the foregoing and other operations and/or functions of the units in the data processing apparatus 400 are separately used to implement the corresponding procedure of the method in FIG. 3. For brevity, details are not described herein.

Figure 5:
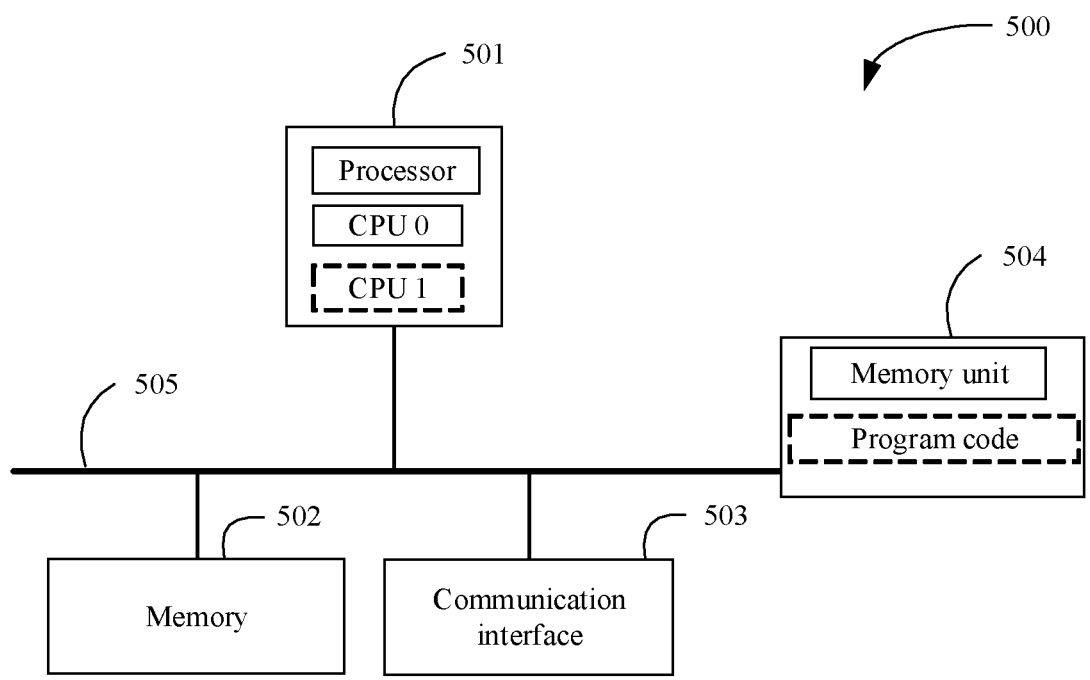
FIG. 5 is a schematic diagram of a structure of a data processing method device according to this application.

FIG. 5 is a schematic diagram of a data processing device 500 according to this application. As shown in the figure, the data processing device 500 includes a processor 501, a memory 502, a communication interface 503, and a memory unit 504. The processor 501, the memory 502, the communication interface 503, and the memory unit 504 communicate by using a bus 505, or may communicate by using another means such as wireless transmission. The memory 502 is configured to store instructions, and the processor 501 is configured to execute the instructions stored in the memory 502. The memory 502 stores program code, and the processor 501 may invoke the program code stored in the memory 502 to perform the following operations:

obtaining first data, where the first data is partial aggregated data in a computing data-intensive computing task, the first data carries a first identifier of a timeout node, and the first identifier is used to indicate that a timeout occurs on the timeout node;

obtaining second data of the timeout node based on the first identifier of the timeout node, where the second data is to-be-aggregated data sent by the timeout node;

aggregating the first data and the second data according to a preset rule to obtain third data, where the third data is complete aggregated data; and notifying each computing node in a cluster of the third data.

It should be understood that in this embodiment of this application, the processor 501 may be a CPU, or the processor 501 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or may be any conventional processor or the like.

The memory 502 may include a read-only memory and a random access memory, and provide instructions and data to the processor 501. The memory 502 may further include a nonvolatile random access memory. For example, the memory 502 may further store information of a device type.

The memory 502 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The bus 505 may further include a power bus, a control bus, a status signal bus, and the like, in addition to a data bus. However, for clear description, various types of buses in the figure are marked as the bus 505.

It should be understood that the data processing device 500 according to this embodiment of this application may correspond to the data processing apparatus 400 in the embodiments of this application, and may correspond to an execution body of the method shown in FIG. 3 according to the embodiments of this application. In addition, the foregoing and other operations and/or functions of the modules in the data processing device 500 are separately used to implement the corresponding procedure of the method in FIG. 3. For brevity, details are not described herein.

In another possible embodiment, this application further provides a cluster. The cluster includes at least a timeout node, a timeout aggregation node, and an upper-level sub-switch directly connected to the timeout node. Each node is configured to implement each operation step in the method shown in FIG. 3. For brevity, details are not described herein.

In another possible embodiment, this application further provides a switch. The switch includes the functional modules shown in FIG. 2, and is configured to perform operation steps corresponding to the root switch or each sub-switch in the method shown in FIG. 3. For brevity, details are not described herein.

In another possible embodiment, this application further provides a cluster. The cluster includes a first switch, a second switch, a root switch, a timeout aggregation node, a first computing node, a second computing node, a third computing node, a fourth computing node, and a fifth computing node. The first computing node, the second computing node, and the third computing node are connected to the first switch. The fourth computing node and the fifth computing node are connected to the second switch.

The first switch and the second switch are connected to the root switch. The timeout aggregation node is any node in the cluster.

Within first duration, the first switch receives first data and second data that are sent by the first computing node and the second computing node, and does not receive data sent by the third computing node. The second switch receives third data and fourth data that are sent by the fourth computing node and the fifth computing node.

The first switch aggregates the first data and the second data to obtain fifth data, and generates a bypass entry. The second switch aggregates the third data and the fourth data to obtain sixth data. The fifth data is partial aggregated data, and the fifth data includes an identifier used to indicate that the third computing node is a timeout node. The bypass entry includes an identifier of the third node and an identifier of an aggregation command, and the bypass entry is used to indicate that a timeout occurs when the third node executes the aggregation command.

The first switch and the second switch respectively send the fifth data and the sixth data to the root switch, to release a first network resource.

The root switch aggregates the fifth data and the sixth data to obtain seventh data. The seventh data includes the identifier of the timeout node.

The root switch sends the seventh data to the timeout aggregation node, and releases a second network resource.

After the first duration passes, the first switch receives eighth data sent by the third computing node.

The first switch determines that the eighth data matches the aggregation command in the bypass entry, adds a timeout flag bit to the eighth data, and sends, to the timeout aggregation node, the eighth data that carries the timeout flag bit. The timeout flag bit is used to indicate that a timeout node corresponding to the eighth data is the third computing node.

The timeout aggregation node aggregates the seventh data and the eighth data that carries the timeout flag bit, to obtain ninth data.

The timeout aggregation node separately notifies the first computing node, the second computing node, the third computing node, the fourth computing node, and the fifth computing node of the ninth data.

In another possible embodiment, this application further provides a cluster. The cluster includes a management node, a first switch, a second switch, a root switch, a timeout aggregation node, a first computing node, a second computing node, a third computing node, a fourth computing node, and a fifth computing node. The first computing node, the second computing node, and the third computing node are connected to the first switch. The fourth computing node and the fifth computing node are connected to the second switch. The first switch and the second switch are connected to the root switch. The timeout aggregation node is any node in the cluster.

The management node determines, based on a timeout status in a historical aggregation operation, that the first computing node is a timeout node.

The first switch sets a flag bit corresponding to the first computing node in an aggregation node bitmap to be invalid. The aggregation node bitmap is used to indicate a directly connected lower-level node of the first switch that participates in aggregation in the first switch.

The first switch receives first data, second data, and third data that are sent by the first computing node, the second computing node, and the third computing node. The second switch receives fourth data and fifth data that are sent by the fourth computing node and the fifth computing node. The first data carries a timeout flag bit used to indicate that the first computing node is a timeout node.

The first switch aggregates the second data and the third data to obtain sixth data. The second switch aggregates the fourth data and the fifth data to obtain seventh data. The sixth data is partial aggregated data, the sixth data includes an identifier of a timeout node, and the identifier of the timeout node is used to indicate the first computing node used as a timeout node.

The first switch and the second switch respectively send the sixth data and the seventh data to the root switch, to release a first network resource, and the first switch sends the first data to the timeout aggregation node.

The root switch aggregates the sixth data and the seventh data to obtain eighth data. The eighth data includes the identifier of the timeout node.

The root switch sends the eighth data to the timeout aggregation node, and releases a second network resource.

The timeout aggregation node aggregates the eighth data and the first data to obtain ninth data.

The timeout aggregation node separately notifies the first computing node, the second computing node, the third computing node, the fourth computing node, and the fifth computing node of the ninth data.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

The foregoing descriptions are merely specific implementations of this application. Any variation or replacement figured out by a person skilled in the art based on the specific implementations provided in this application shall fall within the protection scope of this application.

What is claimed is:

1. A data processing method performed by a timeout aggregation node in a cluster of computing nodes, the method comprising:
obtaining first data, wherein the first data is partial aggregated data in a data-intensive computing task and carries a first identifier of a timeout node, and the first identifier indicates that a timeout occurs on the timeout node;

obtaining second data of the timeout node based on the first identifier of the timeout node, wherein the second data is to-be-aggregated data sent by the timeout node;

aggregating the first data and the second data according to a preset rule to obtain third data, wherein the third data is complete aggregated data; and notifying each computing node in the cluster of the third data.

2. The method according to claim 1, wherein the step of aggregating the first data and the second data to obtain third data comprises:

determining data types of the first data and the second data; and when an aggregation result of the data types is unrelated to an aggregation sequence, aggregating the first data and the second data based on an obtaining sequence to obtain the third data; or when an aggregation result of the data types is related to an aggregation sequence, aggregating the first data and the second data based on a preset aggregation sequence to obtain the third data.

3. The method according to claim 1, wherein the second data comprises a timeout flag bit, and the timeout flag bit indicates that the second data is to-be-aggregated data of the timeout node and participates in aggregation at the timeout aggregation node.

4. The method according to claim 1, wherein the timeout aggregation node is a fixed node in the cluster, a node determined based on a network load status; or a node randomly selected based on an identifier of each node in the cluster.

5. The method according to claim 1, wherein the timeout aggregation node is an upper-level sub-switch or a root switch directly connected to the timeout node.

6. The method according to claim 5, further comprising:

at a first moment, receiving fourth data sent by a first node, and receiving fifth data sent by a second node; and when no data sent by a third node is received at a second moment, aggregating the fourth data and the fifth data to obtain sixth data, wherein the sixth data carries a second identifier of the third node, the second identifier indicates that the third node is a timeout node, and a duration from the first moment to the second moment exceeds a first threshold, wherein the first node, the second node, and the third node are sub-switches or computing nodes directly connected to the timeout aggregation node.

7. The method according to claim 6, wherein when no data sent by the third node is received at the second moment, the method further comprises:

generating a bypass entry in reserved storage space, wherein the bypass entry comprises an identifier of the third node and an identifier of an aggregation command, and the bypass entry indicates that a timeout occurs when the third node executes the aggregation command.

8. A data processing device in a cluster of computing nodes, comprising:

a memory storing executable instructions; and a processor configured to execute the executable instructions to:

obtain first data, wherein the first data is partial aggregated data in a data-intensive computing task and carries a first identifier of a timeout node, and the first identifier indicates that a timeout occurs on the timeout node;

obtain second data of the timeout node based on the first identifier of the timeout node, wherein the second data is to-be-aggregated data sent by the timeout node;

aggregate the first data and the second data according to a preset rule to obtain third data, wherein the third data is complete aggregated data; and notify each computing node in the cluster of the third data.

9. The data processing device according to claim 8, wherein the processor is configured to aggregate the first data and the second data by:

determining data types of the first data and the second data; and when an aggregation result of the data types is unrelated to an aggregation sequence, aggregating the first data and the second data based on an obtaining sequence, to obtain the third data; or when an aggregation result of the data types is related to an aggregation sequence, aggregating the first data and the second data based on a preset aggregation sequence, to obtain the third data.

10. The data processing device according to claim 8, wherein the second data comprises a timeout flag bit, and the timeout flag bit indicates that the second data is to-be-aggregated data of the timeout node and participates in aggregation at the timeout aggregation node.

11. The data processing device according to claim 8, wherein the timeout aggregation node is a fixed node in the cluster, a node determined based on a network load status, or a node randomly selected based on an identifier of each node in the cluster.

12. The data processing device according to claim 8, wherein the timeout aggregation node is an upper-level sub-switch or a root switch directly connected to the timeout node.

13. The data processing device according to claim 8, wherein the processor is further configured to perform:

at a first moment, receive fourth data sent by a first node, and receiving fifth data sent by a second node; and when no data sent by a third node is received at a second moment, aggregate the fourth data and the fifth data to obtain sixth data, wherein the sixth data carries a second identifier of the third node, the second identifier indicates that the third node is a timeout node, and a duration from the first moment to the second moment exceeds a first threshold, wherein the first node, the second node, and the third node are sub-switches or computing nodes directly connected to the timeout aggregation node.

14. The device according to claim 13, wherein when no data sent by the third node is received at the second moment, the processor is further configured to:

generate a bypass entry in reserved storage space, wherein the bypass entry comprises an identifier of the third node and an identifier of an aggregation command, and the bypass entry indicates that a timeout occurs when the third node executes the aggregation command.

15. A system of computing nodes for data processing, comprising:

a timeout aggregation node; and a sub-switch configured to determine a timeout node, wherein the sub-switch is directly connected to the timeout node;

wherein the timeout aggregation node is configured to perform operations of:

obtaining first data that is partial aggregated data in a data-intensive computing task and carries a first identifier of the timeout node, and the first identifier indicates that a timeout occurs on the timeout node;

obtaining second data of the timeout node based on the first identifier of the timeout node, wherein the second data is to-be-aggregated data sent by the timeout node;

aggregating the first data and the second data according to a preset rule to obtain third data, wherein the third data is complete aggregated data; and notifying each computing node in the system regarding the third data.

16. The system according to claim 15, wherein the operation of aggregating the first data and the second data to obtain third data comprises:

determining data types of the first data and the second data; and when an aggregation result of the data types is unrelated to an aggregation sequence, aggregating the first data and the second data based on an obtaining sequence to obtain the third data; or when an aggregation result of the data types is related to an aggregation sequence, aggregating the first data and the second data based on a preset aggregation sequence to obtain the third data.

17. The system according to claim 15, wherein the second data comprises a timeout flag bit, and the timeout flag bit indicates that the second data is to-be-aggregated data of the timeout node and participates in aggregation at the timeout aggregation node.

18. The system according to claim 17, wherein the sub-switch is configured to determine the timeout node based on a locally preset time threshold, and to generate the timeout flag bit based on a local bypass entry.

19. The system according to claim 18, wherein the sub-switch is configured to generate the bypass entry in a local storage space, the bypass entry indicates a correspondence between the timeout node and an aggregation command.

20. The system according to claim 15, wherein the timeout aggregation node is a fixed node in the system, a node determined based on a network load status; or a node randomly selected based on an identifier of each computing node in the system.

* * * * *